(12) United States Patent
Oh et al.

(10) Patent No.: US 11,321,230 B2
(45) Date of Patent: *May 3, 2022

(54) MEMORY SYSTEM, DATA PROCESSING SYSTEM INCLUDING THE SAME AND OPERATING METHOD OF THE SAME

(71) Applicant: SK hynix Inc., Gyeonggi-do (KR)

(72) Inventors: Ik-Sung Oh, Gyeonggi-do (KR); Jin-Woong Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/918,063

(22) Filed: Jul. 1, 2020

(65) Prior Publication Data

US 2020/0334140 A1 Oct. 22, 2020

Related U.S. Application Data

(63) Continuation of application No. 15/862,755, filed on Jan. 5, 2018, now Pat. No. 10,733,093.

(30) Foreign Application Priority Data

Apr. 21, 2017 (KR) .......................... 10-2017-0051481

(51) Int. Cl.
*G06F 12/02* (2006.01)
*G06F 3/06* (2006.01)

(52) U.S. Cl.
CPC .......... *G06F 12/0246* (2013.01); *G06F 3/061* (2013.01); *G06F 3/0616* (2013.01);
(Continued)

(58) Field of Classification Search
CPC .... G06F 3/061; G06F 12/0246; G06F 3/0635; G06F 3/0616; G06F 3/0688; G06F 2212/2022
(Continued)

(56) References Cited

U.S. PATENT DOCUMENTS

| 2014/0351456 | A1 | 11/2014 | Sharifie et al. |
| 2018/0018105 | A1* | 1/2018 | Magro ................. G06F 13/287 |
| 2018/0018583 | A1* | 1/2018 | Cha ....................... G06F 3/0685 |

FOREIGN PATENT DOCUMENTS

| CN | 105425903 A | 3/2016 |
| CN | 106055267 A | 10/2016 |

OTHER PUBLICATIONS

Office Action issued by the Chinese Patent Office dated Oct. 30, 2020.
(Continued)

*Primary Examiner* — Hua J Song
(74) *Attorney, Agent, or Firm* — IP & T Group LLP

(57) ABSTRACT

A memory system may include: a memory device including a plurality of memory dies suitable for storing data; and a controller operatively coupled to the memory dies of the memory device via a plurality of channels, the controller may be suitable for checking the plurality of the channels, selecting independently best transmission channels and best reception channels among the plurality of the channels according to states of the channels, requesting performing of command operations corresponding to the commands through the best transmission channels to the memory dies, and receiving performance results of the command operations through the best reception channels from the memory dies.

9 Claims, 13 Drawing Sheets

(52) U.S. Cl.
CPC .......... *G06F 3/0635* (2013.01); *G06F 3/0688* (2013.01); *G06F 2212/2022* (2013.01)

(58) Field of Classification Search
USPC ........................................... 711/154
See application file for complete search history.

(56) References Cited

OTHER PUBLICATIONS

Certificate of Invention Patent issued by the CNIPA on Mar. 4, 2022.

\* cited by examiner

MEMORY SYSTEM, DATA PROCESSING SYSTEM INCLUDING THE SAME AND OPERATING METHOD OF THE SAME

CROSS-REFERENCE TO RELATED APPLICATION

This application is a continuation of U.S. patent application Ser. No. 15/862,755 filed on Jan. 5, 2018, which claims benefits of priority of Korean Patent Application No. 10-2017-0051481 filed on Apr. 21, 2017. The disclosure of each of the foregoing application is incorporated herein by reference in its entirety.

TECHNICAL FIELD

Exemplary embodiments relate to a memory system and, more particularly, to a memory system for processing data with to a memory device, a data processing system including the same and an operating method of the same.

DISCUSSION OF THE RELATED ART

The computer environment paradigm has changed to ubiquitous computing systems that can be used anytime and anywhere. Due to this fact, use of portable electronic devices such as mobile phones, digital cameras, and notebook computers has rapidly increased. These portable electronic devices generally use a memory system having one or more memory devices for storing data. A memory system may be used as a main memory or an auxiliary memory of a portable electronic device.

Memory systems provide excellent stability, durability, high information access speed, and low power consumption since they have no moving parts. Examples of memory systems having such advantages include universal serial bus (USB) memory devices, memory cards having various interfaces, and solid state drives (SSD).

SUMMARY

Various embodiments of the present invention are directed to a memory system comprising at least one memory device that is simpler, and exhibits reduced performance deterioration and enhanced use efficiency of the at least one memory device. The memory system can process data to and from the memory device more quickly and stably than existing memory systems. Various embodiments of the present invention are also directed to a data processing system including the memory system and to an operating method of the memory system and the data processing system.

In an embodiment, a memory system may include: a memory device including a plurality of memory dies suitable for storing data; and a controller operatively coupled to the memory dies of the memory device via a plurality of channels, the controller may be suitable for checking the plurality of the channels, selecting independently best transmission channels and best reception channels among the plurality of the channels according to states of the channels, requesting performing of command operations corresponding to the commands through the best transmission channels to the memory dies, and receiving performance results of the command operations through the best reception channels from the memory dies.

The controller may further match the command operations requested to the memory dies through the best transmission channels and the performance results received from the memory dies through the best reception channels, and then may provide the performance results to a host as responses to the commands.

The controller may further match descriptors of the commands for the command operations requested through the best transmission channels and descriptors of the performance results received through the best reception channels.

The controller may include at least one channel queuing module which queues the channels, and the channel queuing module may perform channel switching to the best transmission channels and the best reception channels, and may store channel information on the best transmission channels.

The controller may include a plurality of channel queueing modules respectively corresponding to one or more groups of shared channels of the channels, the memory dies may include one or more memory die groups respectively corresponding to the groups of shared channels, memory dies of each memory die groups may share channels of corresponding group of shared channels, and the controller may check the channels of the respective groups of shared channels, may select best transmission channels and best reception channels for the respective groups of shared channels.

The descriptors of the commands may include data information or location information corresponding to the commands and indication information of the best transmission channels.

The descriptors of the performance results may include data information or location information corresponding to the performance results and indication information of the best reception channels.

The controller may further release the best transmission channels after requesting the command operations through the best transmission channels, and may release the best reception channels after receiving the performance results through the best reception channels.

The controller may select first channels and second channels among the channels respectively as the best transmission channels and the best reception channels; may release the first channels after requesting first command operations through the first channels; and may release the second channels after receiving performance results of the first command operations through the second channels.

The controller may release the second channels after requesting second command operations through the released second channels; and may release the first channels after receiving performance results of the second command operations through the released first channels.

The controller may select channels of a ready state or an idle state under a normal state among the channels, as the best transmission channels and the best reception channels.

The controller may check available capacities or operation levels of the channels, and may select the best transmission channels and the best reception channels among the channels in correspondence to the available capacities or operation levels.

The memory system may further include a channel hub module coupled with the controller through the channels, and suitable for transferring the commands and the performance results between the controller and the memory dies through the best transmission and reception channels.

In an embodiment, a data processing system may include: a plurality of memory systems including a plurality of memory devices and a plurality of controllers which respectively correspond to the memory devices; and a host device suitable for providing user requests for the memory systems, a first controller of a first memory system among the memory systems may check a plurality of channels for the memory systems, may select best transmission channels and best reception channels among the channels according to states of the channels, may transmit commands corresponding to the user requests to the memory systems through the best transmission channels, and may receive performance results of command operations corresponding to the commands through the best reception channels from the memory systems.

The first controller may select first channels and second channels among the channels as the best transmission channels and the best reception channels, may release the first channels for the first commands after transmitting first commands through the first channels to a second memory system among the memory systems, and may release the second channels for the second commands after transmitting second commands through the second channels to a third memory system among the memory systems.

The first controller may release the second channels for the first command operations after receiving performance results of first command operations corresponding to the first commands through the released second channels, and may release the first channels for the second command operations after receiving performance results of second command operations corresponding to the second commands through the released first channels.

In an embodiment, a method for operating a memory system, the method may include: checking a plurality of channels for a plurality of memory dies suitable for storing data; selecting best transmission channels and best reception channels among the channels according to states of the channels; requesting performing of command operations corresponding to the commands through the best transmission channels to the memory dies; receiving performance results of the command operations through the best reception channels from the memory dies; matching the command operations requested to the memory dies through the best transmission channels and the performance results received from the memory dies through the best reception channels; and providing the performance results to the host as responses to the commands.

The matching may match descriptors of the commands for the command operations requested through the best transmission channels and descriptors of the performance results received through the best reception channels.

The method may further include: releasing the best transmission channels after requesting the command operations through the best transmission channels; and releasing the best reception channels after receiving the performance results through the best reception channels.

The determining may be performed by selecting, as the best transmission channels and the best reception channels, channels having available capacities or operation levels and having a ready state or an idle state under a normal state among the channels.

BRIEF DESCRIPTION OF THE DRAWINGS

These and other features and advantages of the present invention will become apparent to those skilled in the art to which the present invention pertains from the following detailed description in reference to the accompanying drawings, wherein.

DETAILED DESCRIPTION

Figure 1:
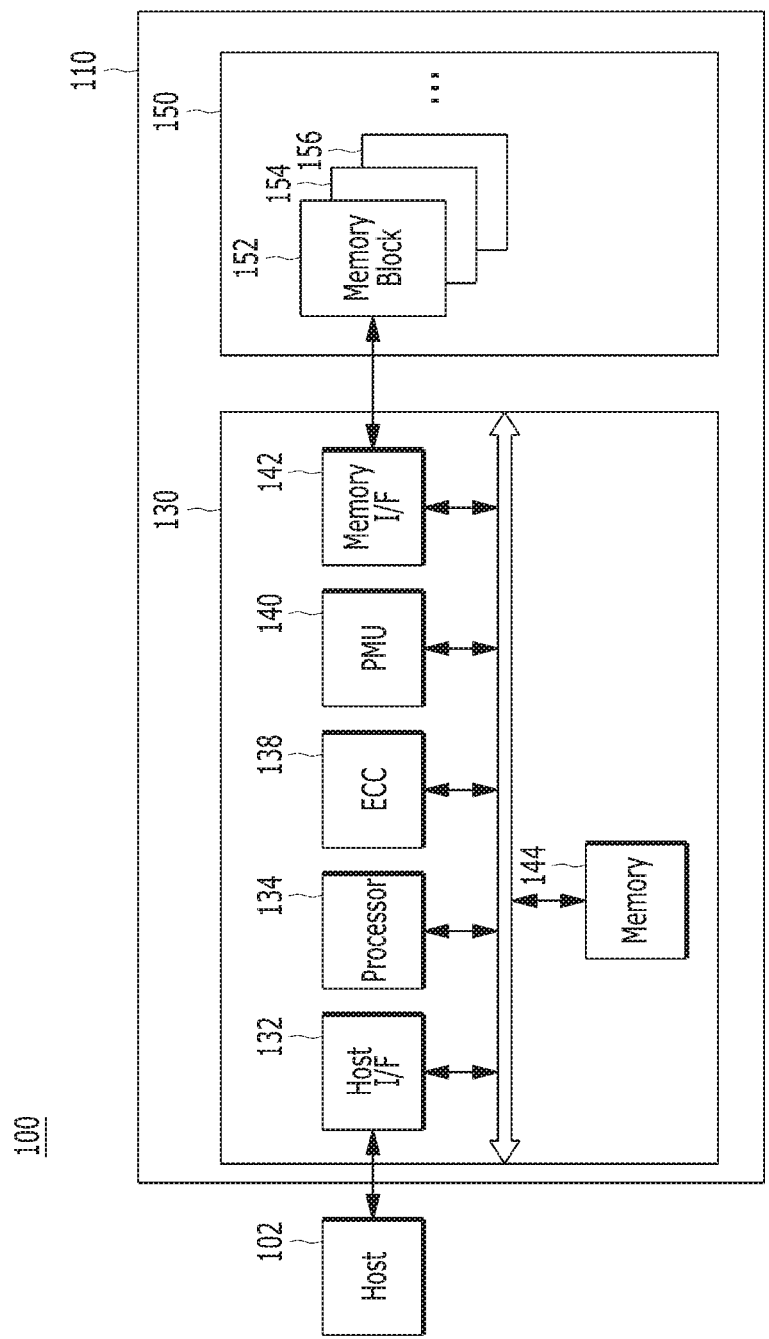
FIG. 1 is a block diagram illustrating a data processing system including a memory system, in accordance with an embodiment of the present invention.

Various embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Various embodiments of the present invention are described below in more detail with reference to the accompanying drawings. We note, however, that the present invention may be embodied in different other embodiments, forms and variations thereof and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention. As used herein, singular forms are intended to include the plural forms as well, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an Idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically Indicated.

FIG. 1 is a block diagram illustrating a data processing system 100 including a memory system 110 in accordance with an embodiment of the present invention.

Referring to FIG. 1, the data processing system 100 may include a host 102 and the memory system 110.

The host 102 may include portable electronic devices such as a mobile phone, MP3 player and laptop computer or non-portable electronic devices such as a desktop computer, game machine, TV and projector.

The memory system 110 may operate to store data for the host 102 in response to a request of the host 102. Non-limited examples of the memory system 110 may include a solid state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC. The SD card may include a mini-SD card and micro-SD card.

The memory system 110 may be embodied by various types of storage devices. Non-limited examples of storage devices included may include volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM) and a flash memory. The flash memory may have a 3-dimensional (3D) stack structure.

The memory system 110 may include a memory device 150 and a controller 130. The memory device 150 may store data for the host 120, and the controller 130 may control data storage into the memory device 150.

The controller 130 and the memory device 150 may be integrated into a single semiconductor device, which may be included in the various types of memory systems as exemplified above.

Non-limited application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host 102 through a write operation, and provide data stored therein to the host 102 through a read operation. The memory device 150 may include a plurality of memory dies (not shown), each memory die including a plurality of planes (not shown), each plane including a plurality of memory blocks 152 to 156, each of the memory blocks 152 to 156 may include a plurality of pages, and each of the pages may include a plurality of memory cells coupled to a word line.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program and erase operations of the memory device 150.

The controller 130 may include a host interface (I/F) unit 132, a processor 134, an error correction code (ECC) unit 138, a Power Management Unit (PMU) 140, a NAND flash controller (NFC) 142 and a memory 144 all operatively coupled via an internal bus.

The host interface unit 132 may be configured to process a command and data of the host 102, and may communicate with the host 102 through one or more of various interface protocols such as universal serial bus (USB), multi-media card (MMC), peripheral component interconnect-express (PCI-E), small computer system interface (SCSI), serial-attached SCSI (SAS), serial advanced technology attachment (SATA), parallel advanced technology attachment (PATA), enhanced small disk interface (ESDI) and integrated drive electronics (IDE).

The ECC unit 138 may detect and correct an error contained in the data read from the memory device 150. In other words, the ECC unit 138 may perform an error correction decoding process to the data read from the memory device 150 through an ECC code used during an ECC encoding process. According to a result of the error correction decoding process, the ECC unit 138 may output a signal, for example, an error correction success/fail signal. When the number of error bits is more than a threshold value of correctable error bits, the ECC unit 138 may not correct the error bits, and may output an error correction fail signal.

The ECC unit 138 may perform error correction through a coded modulation such as Low Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). However, the ECC unit 138 is not limited thereto. The ECC unit 138 may include all circuits, modules, systems or devices for error correction.

The PMU 140 may provide and manage power of the controller 130.

The NFC 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the NFC 142 may generate a control signal for the memory device 150 and process data to be provided to the memory device 150 under the control of the processor 134. The NFC 142 may work as an interface (e.g., a NAND flash Interface) for processing a command and data between the controller 130 and the memory device 150. Specifically, the NFC 142 may support data transfer between the controller 130 and the memory device 150.

The memory 144 may serve as a working memory of the memory system 110 and the controller 130, and store data for driving the memory system 110 and the controller 130. The controller 130 may control the memory device 150 to perform read, write, program and erase operations in response to a request from the host 102. The controller 130 may provide data read from the memory device 150 to the host 102, may store data provided from the host 102 into the memory device 150. The memory 144 may store data required for the controller 130 and the memory device 150 to perform these operations.

The memory 144 may be embodied by a volatile memory. For example, the memory 144 may be embodied by static random access memory (SRAM) or dynamic random access memory (DRAM). The memory 144 may be disposed within or out of the controller 130. FIG. 1 exemplifies the memory 144 disposed within the controller 130. In an embodiment, the memory 144 may be embodied by an external volatile memory having a memory interface transferring data between the memory 144 and the controller 130.

The processor 134 may control the overall operations of the memory system 110. The processor 134 may drive firmware to control the overall operations of the memory system 110. The firmware may be referred to as flash translation layer (FTL).

The processor 134 of the controller 130 may include a management unit (not illustrated) for performing a bad management operation of the memory device 150. The management unit may perform a bad block management operation of checking a bad block, in which a program fail occurs due to the characteristic of a NAND flash memory during a program operation, among the plurality of memory blocks 152 to 156 included in the memory device 150. The management unit may write the program-failed data of the bad block to a new memory block. In the memory device 150 having a 3D stack structure, the bad block management operation may reduce the use efficiency of the memory device 150 and the reliability of the memory system 110. Thus, the bad block management operation needs to be performed with more reliability.

In the case where the controller 130 performs a plurality of command operations to the memory device 150, best (meaning optimum) transmission and reception channels (and or ways) are selected among a plurality of channels (and or ways) coupled with a plurality of memory dies included in the memory device 150 and commands and operation results may be transferred between the controller 130 and the memory dies through optimum selected transmission and reception channels (and or ways).

The controller 130 may check the states, for example, a busy state, a ready state, an active state, an idle state, a normal state or an abnormal state of the plurality of channels (and or ways) in order to select the best transmission and reception channels (and or ways) according to the states of the channels (and or ways). The controller 130 matches the descriptors of the commands transmitted through the best transmission channels (or transmission ways) and the descriptors of the performance results received through the best reception channels (or reception ways), and then, provides the performance results of the command operations to the host 102.

The descriptors of the commands may Include data information or location information corresponding to the commands, and indication information of transmission channels (or transmission ways). For example, the data information may be logical page information of data corresponding to write commands or read commands, and the location information may be the physical page information of the memory device 150. For example, the indication information of transmission channels (or transmission ways) may be the identifiers (for example, channel numbers (and or way numbers)) of the transmission channels (or the transmission ways).

The descriptors of the performance results may include data information or location information corresponding to the performance results and indication information of the transmission channels (or the transmission ways). For example, the data information may be logical page information for data, and the location information may be the physical page information of the memory device 150. For example, the indication information of the transmission channels (or the transmission ways) may be channel numbers (and or way numbers) of the transmission channels (or the transmission ways).

In accordance with the embodiment of the present disclosure, the transmission channels (or transmission ways) and the reception channels (or reception ways) are managed independently of each other.

Therefore, in accordance with an embodiment of the present disclosure, the plurality of channels (and or ways) coupled with the plurality of memory dies of the memory device 150 may be used efficiently. In particular, since the plurality of commands and the performance results of the command operations corresponding to the commands are respectively transmitted and received through the best channels (and or ways) which are independent of each other, the operational performance of the memory system 110 may be improved.

A management unit (not shown) for performing bad management for the memory device 150 may be included in the processor 134 of the controller 130. The management unit checks a bad block in the plurality of memory blocks 152, 154 and 156 included in the memory device 150, and then, performs bad block management of processing a checked bad block as a bad. The bad management means that, in the case where the memory device 150 is a flash memory, for example, a NAND flash memory, a program fail may occur when performing data write, for example, data program, due to the characteristic of the NAND flash memory, a memory block where the program fail has occurred is processed as a bad, and program-failed data are written, that is, programmed, in a new memory block. Moreover, in the case where the memory device 150 has a 3-dimensional stack structure as described above, if a corresponding block is processed as a bad block according to a program fail, because the utilization efficiency of the memory device 150 and the reliability of the memory system 110 may deteriorate abruptly, it is necessary to reliably perform bad block management. Hereinbelow, a memory device in the memory system in accordance with the embodiment of the present disclosure will be described below in detail with reference to FIGS. 2 to 4.

Figure 2:
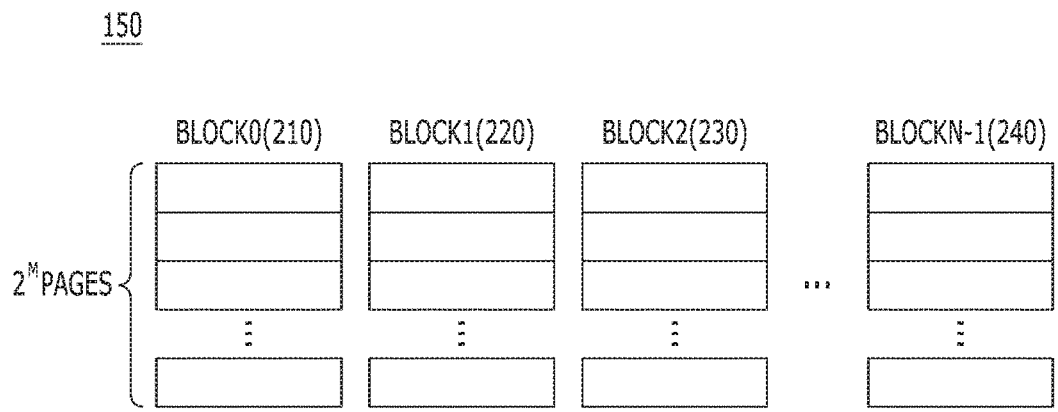
FIG. 2 is a schematic diagram illustrating an exemplary configuration of a memory device employed in the memory system shown in FIG. 1.

FIG. 2 is a diagram illustrating the memory device 150.

Referring to FIG. 2, the memory device 150 may include a plurality of memory blocks 0 to N−1, and each of the blocks 0 to N−1 may include a plurality of pages, for example, $2^M$ pages, the number of which may vary according to circuit design. Memory cells included in the respective memory blocks 0 to N−1 may be one or more of a single level cell (SLC) storing 1-bit data, or a multi-level cell (MLC) storing 2 bit data. In an embodiment, the memory device 150 may include a plurality of triple level cells (TLC) each storing 3-bit data. In another embodiment, the memory device may include a plurality of quadruple level cells (QLC) each storing 4-bit level cell.

Figure 3:
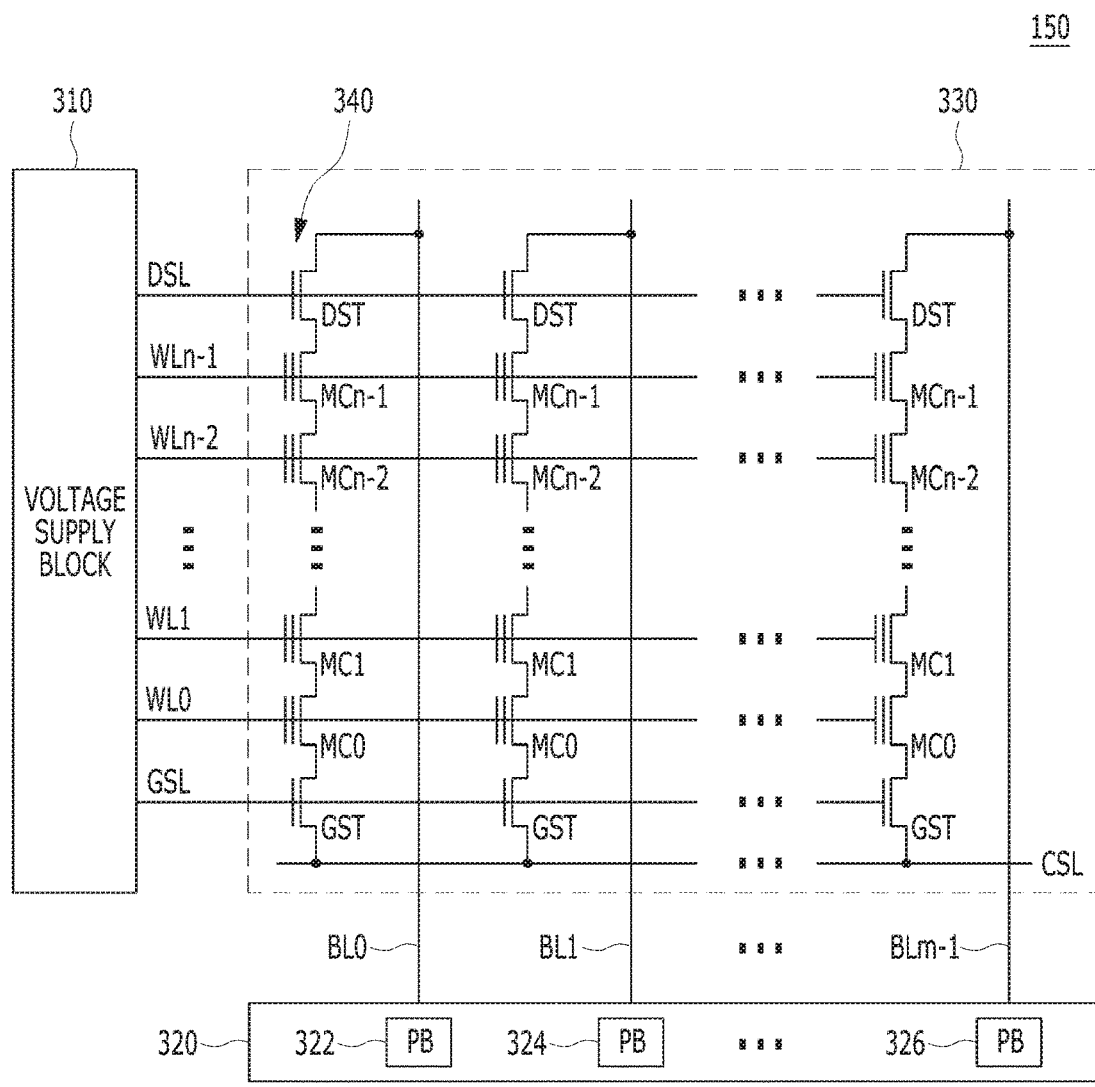
FIG. 3 is a circuit diagram illustrating an exemplary configuration of a memory cell array of a memory block in the memory device shown in FIG. 2.

FIG. 3 is a circuit diagram illustrating an exemplary configuration of a memory cell array of a memory block in the memory device 150.

Referring to FIG. 3, a memory block 330 which may correspond to any of the plurality of memory blocks 152 to 156 included in the memory device 150 of the memory system 110 may include a plurality of cell strings 340 coupled to a plurality of corresponding bit lines BL0 to BLm−1. The cell string 340 of each column may include one or more drain select transistors DST and one or more source select transistors SST. Between the drain and source select transistors DST and SST, a plurality of memory cells MC0 to MCn−1 may be coupled in series. In an embodiment, each of the memory cell transistors MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as illustrated in FIG. 3, the first cell string is coupled to the first bit line BL0, and the last cell string is coupled to the last bit line BLm−1.

Although FIG. 3 illustrates NAND flash memory cells, the invention is not limited in this way. It is noted that the memory cells may be NOR flash memory cells, or hybrid flash memory cells including two or more kinds of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply unit 310 which provides word line voltages including a program voltage, a read voltage and a pass voltage to supply to the word lines according to an operation mode. The voltage generation operation of the voltage supply unit 310 may be controlled by a control circuit (not illustrated). Under the control of the control circuit, the voltage supply unit 310 may select one of the memory blocks (or sectors) of the memory cell array, select one of the word lines of the selected memory block, and provide the word line voltages to the selected word line and the unselected word lines as may be needed.

The memory device 150 may include a read/write circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

Figure 4:
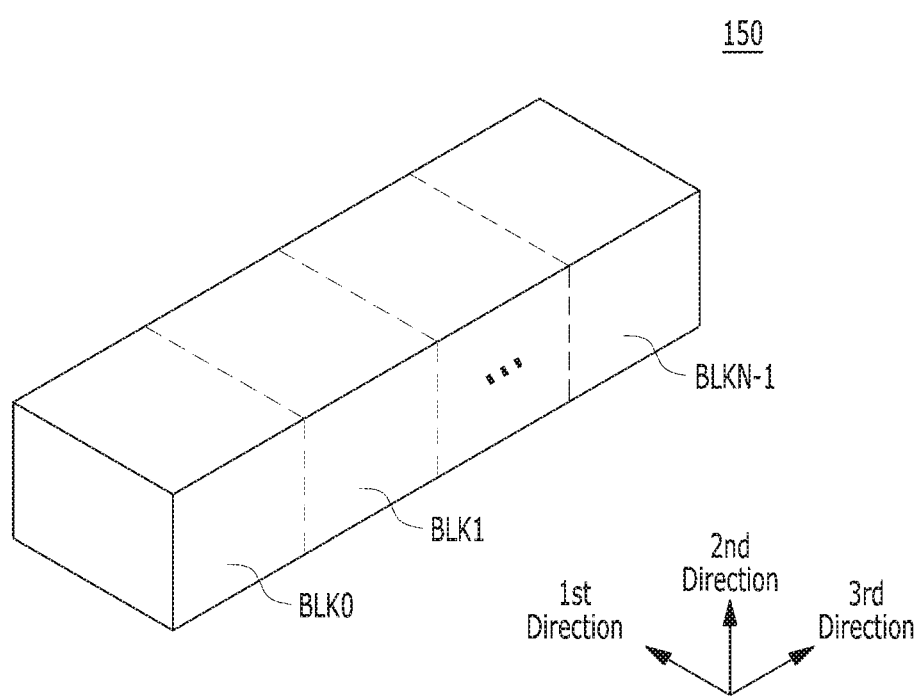
FIG. 4 is a schematic diagram illustrating an exemplary three-dimensional structure of the memory device shown in FIG. 2.

FIG. 4 is a schematic diagram illustrating an exemplary 3D structure of the memory device 150.

The memory device 150 may be embodied by a 2D or 3D memory device. Specifically, as illustrated in FIG. 4, the memory device 150 may be embodied by a nonvolatile memory device having a 3D stack structure. When the memory device 150 has a 3D structure, the memory device 150 may include a plurality of memory blocks BLK0 to BLKN−1 each having a 3D structure (or vertical structure).

FIGS. 5 to 8 are schematic diagrams for illustrating the performance of a plurality of command operations corresponding to a plurality of commands in a memory system in accordance with an embodiment.

In accordance with an embodiment of the present disclosure, a data processing system is provided including a plurality of memory systems each including the controller 130 and the memory device 150 operatively coupled to each other via a plurality of channels (and/and or ways). In operation, a plurality of commands are transmitted through a plurality of channels (and or ways) for the respective memory systems, and performance results of the command operations in the plurality of memory system are transmitted through a plurality of channels (and or ways) from the respective memory systems. In accordance with an embodiment of the present disclosure, a master memory system among the memory systems independently determines the best transmission channel (or transmission way) and the best reception channel (or reception way) among a plurality of channels (and or ways) for each of the memory systems, and transfers the plurality of commands and the performance results of command operations through the best transmission channels (or transmission ways) and the reception channels (or reception ways) for the respective memory systems.

In accordance with an embodiment of the present disclosure, the master memory system checks whether each of a plurality of channels (and or ways) for a plurality of memory systems is in a busy state, a ready state, an active state, an idle state, a normal state or an abnormal state.

In accordance with an embodiment of the present disclosure, the master memory system or the controller 130 may select the best channel (and or ways) among the channels (and or ways) in the ready state or the Idle state under the normal state for each of the memory systems or for the memory system 150. In particular, in accordance with an embodiment of the present disclosure, the master memory system or the controller 130 may select, as the best channel (and or way), a channel (and or way) among the channels (and or ways) having available capacities within a normal range or having operation levels in a normal range for each of the memory systems or the memory system 150. The operation level of a channel (or a way) may be determined by an operation clock, a power level, a current/voltage level, an operation timing and a temperature level of the channel (or the way).

Figure 5:
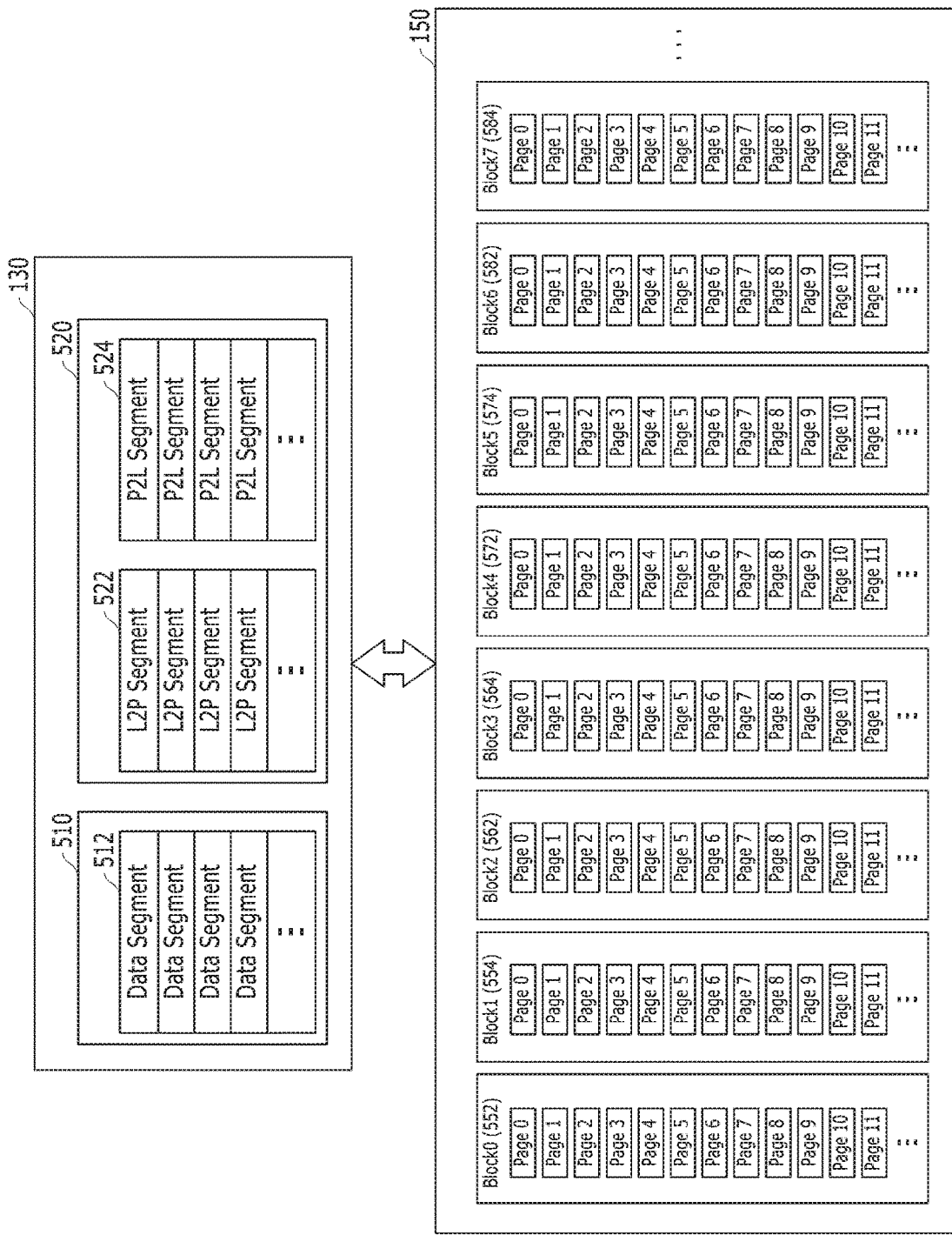
FIG. 5 is a schematic diagram of a memory system in accordance with an embodiment of the present Invention.

First, referring to FIG. 5, the controller 130 performs command operations, for example, program operations corresponding to a plurality of write commands. At this time, the controller 130 programs and stores user data corresponding to the write commands, in memory blocks 552, 554, 562, 564, 572, 574, 582 and 584 of the memory device 150. Also, in correspondence to the program operations to the memory blocks 552, 554, 562, 564, 572, 574, 582 and 584, the controller 130 generates and updates metadata for the user data and stores the metadata in the memory blocks 552, 554, 562, 564, 572, 574, 582 and 584 of the memory device 150.

The controller 130 generates and updates information indicating that the user data are stored in the pages included in the memory blocks 552, 554, 562, 564, 572, 574, 582 and 584 of the memory device 150, for example, first map data and second map data, that is, generates and updates the logical segments of the first map data, that is, L2P segments, and the physical segments of the second map data, that is, P2L segments, and then, stores the L2P segments and the P2L segments in the pages included in the memory blocks 552, 554, 562, 564, 572, 574, 582 and 584 of the memory device 150.

For example, the controller 130 caches and buffers the user data corresponding to the write commands, in a first buffer 510 included in the memory 144 of the controller 130, that is, stores data segments 512 of the user data in the first buffer 510 as a data buffer/cache. Then, the controller 130 stores the data segments 512 stored in the first buffer 510, in the pages included in the memory blocks 552, 554, 562, 564, 572, 574, 582 and 584 of the memory device 150. As the data segments 512 of the user data corresponding to the write commands are programmed and stored in the pages included in the memory blocks 552, 554, 562, 564, 572, 574, 582 and 584 of the memory device 150, the controller 130 generates and updates the first map data and the second map data, and stores the first map data and the second map data in a second buffer 520 included in the memory 144 of the controller 130. Namely, the controller 130 stores L2P segments 522 of the first map data for the user data and P2L segments 524 of the second map data for the user data, in the second buffer 520 as a map buffer/cache. In the second buffer 520 in the memory 144 of the controller 130, there may be stored, as described above, the L2P segments 522 of the first map data and the P2L segments 524 of the second map data, or there may be stored a map list for the L2P segments 522 of the first map data and a map list for the P2L segments 524 of the second map data. The controller 130 stores the L2P segments 522 of the first map data and the P2L segments 524 of the second map data which are stored in the second buffer 520, in the pages Included in the memory blocks 552, 554, 562, 564, 572, 574, 582 and 584 of the memory device 150.

Also, the controller 130 performs command operations, for example, read operations corresponding to a plurality of read commands. At this time, the controller 130 loads the map segments of user data corresponding to the read commands, for example, L2P segments 522 of first map data and P2L segments 524 of second map data, in the second buffer 520, and checks the L2P segments 522 and the P2L segments 524. After that, the controller 130 reads the user data stored in the pages of corresponding memory blocks among the memory blocks 552, 554, 562, 564, 572, 574, 582 and 584 of the memory device 150, stores data segments 512 of the read user data in the first buffer 510, and provides the data segments 512 to the host 102.

Furthermore, the controller 130 performs command operations, for example, erase operations corresponding to a plurality of erase commands. At this time, the controller 130 checks memory blocks corresponding to the erase commands among the memory blocks 552, 554, 562, 564, 572, 574, 582 and 584 of the memory device 150, and performs the erase operations for the checked memory blocks.

Figure 6:
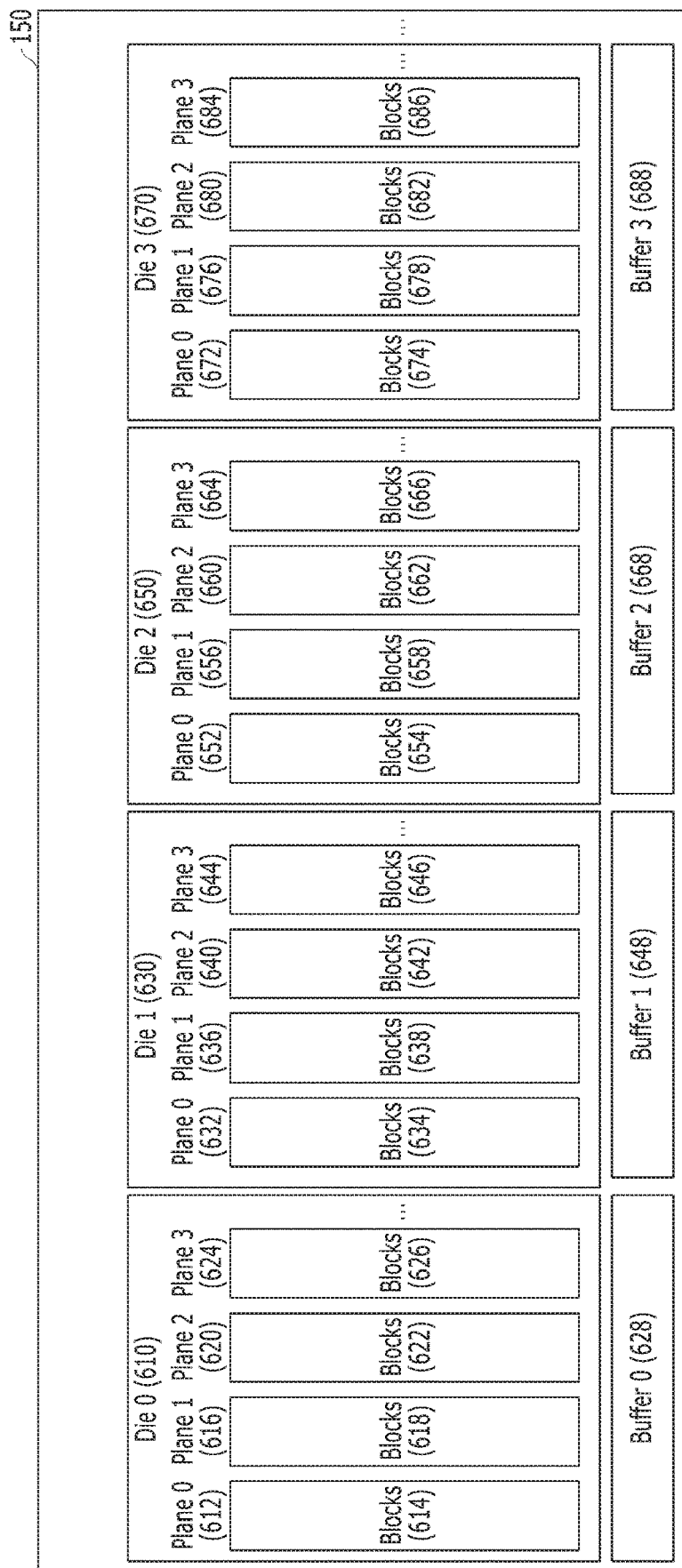
FIG. 6 is a schematic diagram illustrating an exemplary configuration of a memory device of a memory system in accordance with an embodiment of the present invention.

Referring to FIG. 6, according to an embodiment, the memory device 150 includes a plurality of memory dies, for example, a memory die 0 610, a memory die 1 630, a memory die 2 650 and a memory die 3 670. Each of the memory dies 610, 630, 650 and 670 includes a plurality of planes. For example, the memory die 0 610 includes a plane 0 612, a plane 1 616, a plane 2 620 and a plane 3 624, the memory die 1 630 includes a plane 0 632, a plane 1 636, a plane 2 640 and a plane 3 644, the memory die 2 650 includes a plane 0 652, a plane 1 656, a plane 2 660 and a plane 3 664, and the memory die 3 670 includes a plane 0 672, a plane 1 676, a plane 2 680 and a plane 3 684. The respective planes 612, 616, 620, 624, 632, 636, 640, 644, 652, 656, 660, 664, 672, 676, 680 and 684 in the memory dies 610, 630, 650 and 670 included in the memory device 150 include a plurality of memory blocks 614, 618, 622, 626, 634, 638, 642, 646, 654, 658, 662, 666, 674, 678, 682 and 686, for example, N number of blocks Block0, Block1, . . . and BlockN−1 each including a plurality of pages, for example, 2^M number of pages, as described above with reference to FIG. 2. Moreover, the memory device 150 includes a plurality of buffers corresponding to the respective memory dies 610, 630, 650 and 670, for example, a buffer 0 628 corresponding to the memory die 0 610, a buffer 1 648 corresponding to the memory die 1 630, a buffer 2 668 corresponding to the memory die 2 650, and a buffer 3 688 corresponding to the memory die 3 670.

In the case of performing command operations, data corresponding to the command operations are stored in the buffers 628, 648, 668 and 688 included in the memory device 150. For example, in the case of performing program operations, data corresponding to the program operations are stored in the buffers 628, 648, 668 and 688, and are then stored in the pages included in the memory blocks of the memory dies 610, 630, 650 and 670. In the case of performing read operations, data corresponding to the read operations are read from the pages included in the memory blocks of the memory dies 610, 630, 650 and 670, are stored in the buffers 628, 648, 668 and 688, and are then provided to the host 102 through the controller 130.

In accordance with an embodiment of the present disclosure, while it will be described below as an example for the sake of convenience in explanation that the buffers 628, 648, 668 and 688 included in the memory device 150 exist outside the respective corresponding memory dies 610, 630, 650 and 670, it is to be noted that the buffers 628, 648, 668 and 688 may exist inside the respective corresponding memory dies 610, 630, 650 and 670, and it is to be noted that the buffers 628, 648, 668 and 688 may correspond to the respective planes 612, 616, 620, 624, 632, 636, 640, 644, 652, 656, 660, 664, 672, 676, 680 and 684 or the respective memory blocks 614, 618, 622, 626, 634, 638, 642, 646, 654, 658, 662, 666, 674, 678, 682 and 686 in the respective memory dies 610, 630, 650 and 670. Further, in accordance with an embodiment of the present disclosure, while it will be described below as an example for the sake of convenience in explanation that the buffers 628, 648, 668 and 688 included in the memory device 150 are the plurality of page buffers 322, 324 and 326 included in the memory device 150 as described above with reference to FIG. 3, it is to be noted that the buffers 628, 648, 668 and 688 may be a plurality of caches or a plurality of registers included in the memory device 150.

Figure 7:
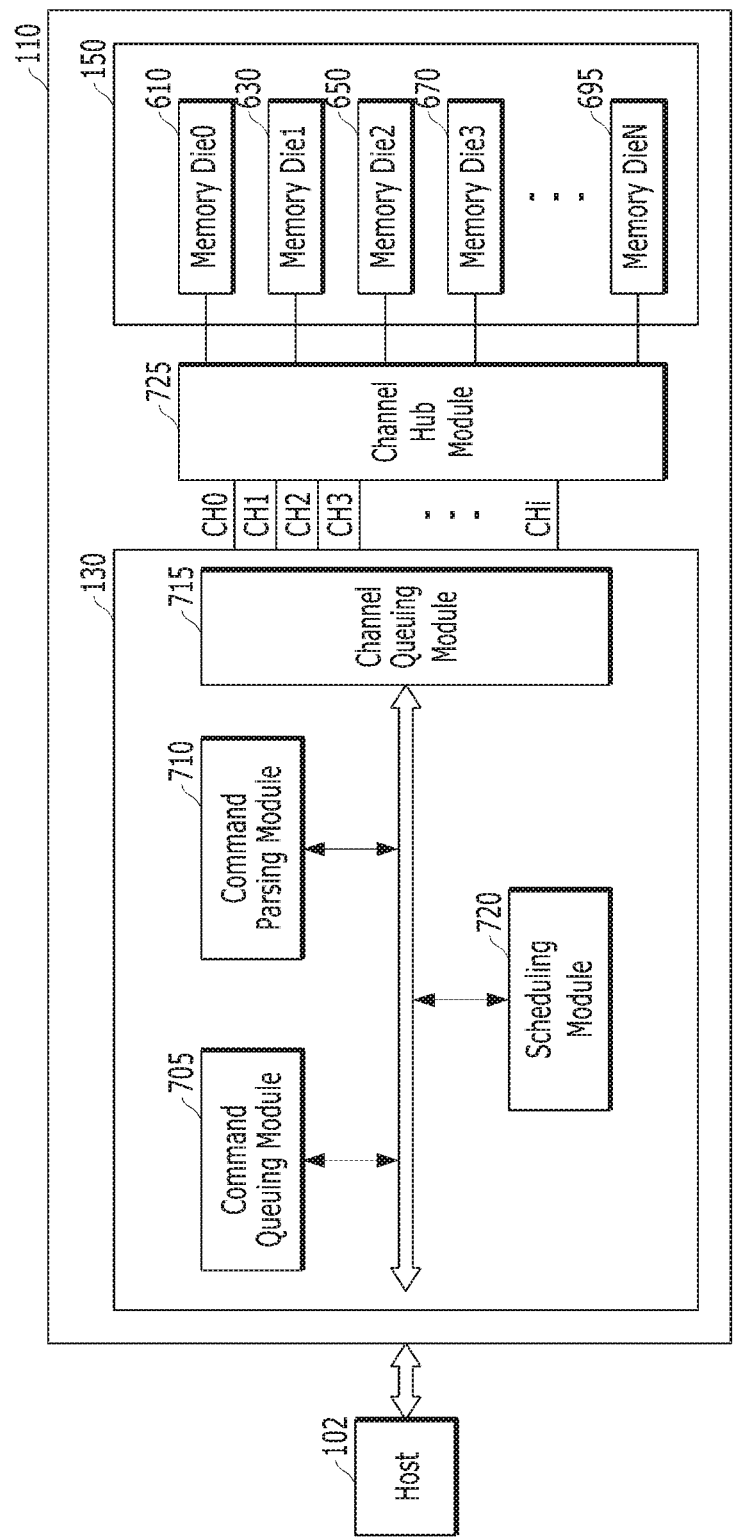
FIG. 7 is a schematic diagram of an exemplary configuration of a data processing system in accordance with an embodiment of the present invention.

Referring to FIG. 7, the controller 130, according to an embodiment, includes a command queuing module 705, a command parsing module 715, a scheduling module 720 and a channel queuing module 715. The command queuing module 705 of the controller 130 queues the plurality of commands provided from the host 102, while the command parsing module 710 of the controller 130 parses the commands queued in the command queuing module 705.

The channel queuing module 715 of the controller 130 queues the channels CH0 to CHi. While the plurality of channels CH0 to CHi for the memory device 150, that is, the channels CH0 to CHi for the plurality of memory dies 610 to 695, are described as an example in accordance with an embodiment of the present disclosure for the sake of convenience in explanation, the same principle may be applied even in the case of a plurality of ways.

The scheduling module 720 schedules the plurality of commands and the plurality of channels CH0 to CHi. The scheduling includes, the scheduling module 720 checking the states (e.g., a busy state, a ready state, an active state, an idle state, a normal state or an abnormal state) of each of the plurality of channels CH0 to CHi which are queued in the channel queuing module 715, and then, depending on the states of each of the plurality of channels CH0 to CHi, the scheduling module 720 independently selects best channels as transmission channels for the commands and reception channels for the performance results. The scheduling module 720 selects as the best channel for each memory system, a channel among the channels having available capacities in a normal range or having operation levels in a normal range for the memory system 150. The operation level of a channel may be determined by an operation clock, a power level, a current/voltage level, an operation timing and a temperature level of the channel.

The controller 130 performs channel switching to the best transmission channels and the best reception channels selected according to the states of the channels CH0 to CHi through the channel queuing module 715.

More specifically, the controller 130 stacks, through the channel queuing module 715, the descriptors of the commands, in particular, stores channel information on the best transmission channels through which the respective commands are transmitted, for example, channel mapping information between the commands and the best transmission channels through which the respective commands are transmitted. Further, the controller 130 stacks, through the channel queuing module 715, the descriptors of the performance results. In particular, the controller 130 matches the descriptors of the commands and the descriptors of the performance results, checks the performance results of the command operations and then, provides the performance results to the host 102.

The channel hub module 725 receives the plurality of commands from the controller 130 through the best transmission channels among the plurality of channels CH0, CH1, CH2, CH3, . . . , CHi, checks the descriptors of the commands, and transmits the commands to the respective corresponding memory dies. Moreover, the channel hub module 725 receives the performance results of the command operations from the memory dies 610, 630, 650, 670, . . . , 695 of the memory device 150, and transmits the performance results of the command operations to the controller 130 through the best reception channels among the plurality of channels CH0, CH1, CH2, CH3, . . . , CHi.

The channel hub module 725 receives channel information about the best reception channels from the controller 130, checks the best reception channels based on the channel information received from the controller 130, and then, transmits the performance results of the command operations to the controller 130 through the best reception channels. In other words, the controller 130 transmits the channel information about the best reception channels, which are selected according to the states of the plurality of channels CH0 to CHi, to the channel hub module 725, and the channel hub module 725 checks the best reception channels based on the channel information and then transmits the performance results of the command operations to the controller 130 through the best reception channels. The channel information on the best reception channels may be transmitted to the channel hub module 725 through an interface protocol between the controller 130 and the memory device 150, for example, a flash interface layer (FIL) protocol. The channel information about the best reception channels may be transmitted to the channel hub module 725 when transmitting the commands through the best transmission channels among the plurality of channels CH0, CH1, CH2, CH3, . . . , CHi, and may be included in reserved areas of the commands, for example, reserved areas in the descriptors of the commands. In the embodiment of FIG. 7, it is described as an example that the plurality of channels CH0, CH1, CH2, CH3, . . . , CHi which exist between the controller 130 and the memory device 150 in the memory system 110 are coupled between the controller 130 and the channel hub module 725. However, it is to be noted that the same principles may be applied even in the case where the channel hub module 725 is provided in one of the memory device 150 or the controller 130, and the controller 130 and the memory device 150 are coupled directly through the plurality of channels CH0 to CHi.

For example, in the case where a plurality of commands, for example, a first read command, a second read command, a first write command and a second write command are respectively received from the host 102, the controller 130 checks the states of each of the plurality of channels CH0, CH1, CH2, CH3, . . . , CHi for the memory device 150, and determines the best transmission channels for transmitting the first read command, the second read command, the first write command and the second write command, among the plurality of channels CH0, CH1, CH2, CH3, . . . , CHi. In the case where the controller 130 transmits the first read command and the first write command at a certain point of time t0 and transmits the second read command and the second write command at a certain point of time t, the controller 130 determines best transmission channels at the point of time t0, that is, best transmission channels for the first read command and the first write command, and determines best transmission channels at the point of time t1, that is, best transmission channels for the second read command and the second write command, depending on the states of the channels CH0, CH1, CH2, CH3, . . . , CHi. For instance, the controller 130 determines, among the plurality of channels CH0, CH1, CH2, CH3, . . . , CHi, the best transmission channel of the first read command as CH1, the best transmission channel of the first write command as CH2, the best transmission channel of the second read command as CH3 and the best transmission channel of the second write command as CH0. The controller 130 generates and stores channel information on the best transmission channels of the respective commands, that is, channel mapping information between the respective commands and the best transmission channels, and stacks the descriptors of the respective commands to be transmitted through the best transmission channel.

The controller 130 transmits the plurality of commands to corresponding memory dies through the best transmission channels determined according to the states of the plurality of commands among the plurality of channels CH0, CH1, CH2, CH3, . . . , CHi. For example, the controller 130 may transmit the first read command through the best transmission channel CH1 to the channel hub module 725, and the channel hub module 725 may transmit the first read command to a corresponding memory die, for example, the memory die 0 610. The controller 130 may also transmit the first write command through the best transmission channel CH2 to the channel hub module 725, and the channel hub module 725 may transmit the first write command to a corresponding memory die, for example, the memory die 1 630. The controller 130 may further transmit the second write command through the best transmission channel CH0 to the channel hub module 725, and the channel hub module 725 may transmit the second write command to a corresponding memory die, for example, the memory die 3 670. The controller 130 may further transmit the second read command through the best transmission channel CH3 to the channel hub module 725, and the channel hub module 725 may transmit the second read command to a corresponding memory die, for example, the memory die 2 650.

After transmitting the plurality of commands through corresponding best transmission channels, the controller 130 releases the best transmission channels for the plurality of commands such that the best transmission channels become available ones of the memory channels CH0 to Chi to be shared for the memory dies 610 to 695 at a next transmission of commands. The controller 130 may perform the above-described operation of selecting a best transmission channel for each of a plurality of commands each time the plurality of commands are to be transferred from the controller 130 to the memory dies 610 to 695. The controller 130 may perform the above-described operation of selecting a best reception channel for each of a plurality of results of command operations performed in response to the commands are to be transferred from the memory dies 610 to 695 to the controller 130.

For example, after transmitting the first read command through the best transmission channel CH1, the controller 130 releases the best transmission channel CH1 for the first read command. According to this fact, the controller 130 shares the best transmission channel CH1 for transmission and reception of other commands or performance results, that is, for other command operations, without occupying the best transmission channel CH1 as a dedicated channel for the first read command, that is, without occupying the best transmission channel CH1 as a dedicated channel for transmission of the first read command and reception of a performance result of a first read operation corresponding to the first read command, that is, a dedicated channel for the first read operation. Also, after transmitting the first write command, the second write command and the second read command through the best transmission channels CH2, CH0 and CH3, the controller 130 releases the best transmission channels CH2, CH0 and CH3 for the first write command, the second write command and the second read command. According to this fact, the controller 130 shares the best transmission channels CH2, CH0 and CH3 for transmission and reception of other commands or performance results, that is, for other command operations, without occupying the best transmission channels CH2, CH0 and CH3 as dedicated channels for the first write command, the second write command and the second read command, that is, without occupying the best transmission channels CH2, CH0 and CH3 as dedicated channels for command operations corresponding to the first write command, the second write command and the second read command.

Command operations corresponding to the plurality of commands transmitted through the best transmission channels are performed in the memory dies 610, 630, 650, 670, . . . , 695 of the memory device 150. For example, the first read operation corresponding to the first read command is performed in the memory die 0 610, a first program operation corresponding to the first write command is performed in the memory die 1 630, a second read operation corresponding to the second read command is performed in the memory die 2 650, and a second program operation corresponding to the second write command is performed in the memory die 3 670. The controller 130 selects the best reception channels in the similar way to the operation of selecting the best transmission channels. The controller 130 selects the best reception channels for receiving, from the memory device 150, the performance results of the command operations corresponding to the commands received from the host 102, among the plurality of channels CH0, CH1, CH2, CH3, . . . , CHi. In the case where the controller 130 receives performance results of the first read operation and the second read operation at a certain point of time t2 and receives performance results of the first program operation and the second program operation at a certain point of time t3, depending on the states of the channels CH0, CH1, CH2, CH3, . . . , CHi, best reception channels at the point of time t2 are determined, that is, best reception channels for the performance result of the first read operation and the performance result of the second read operation are determined, and best reception channels at the point of time t3 are determined, that is, best reception channels for the performance result of the first program operation and the performance result of the second program operation are determined. For instance, the controller 130 determines, among the plurality of channels CH0, CH1, CH2, CH3, . . . , CHi, the best reception channel of the performance result of the first read operation as CH2, the best reception channel of the performance result of the second read operation as CH3, the best reception channel of the performance result of the first program operation as CH1, and the best reception channel of the performance result of the second program operation as CH4.

The controller 130 independently selects the best transmission channels for the plurality of commands received from the host 102 and the best reception channels for the performance results of the command operations corresponding to the plurality of commands, depending on the states of the plurality of channels CH0, CH1, CH2, CH3, . . . , CHi.

The plurality of commands are transmitted through their corresponding best transmission channels and after the transmission is completed, the best transmission channels for the plurality of commands are released, and the controller 130 selects as the best reception channels for the performance results the previously selected best transmission channels or other channels among the channels CH0 to CHi according to the states of the channels CH0 to CHi. For example, depending on the states of the plurality of channels CH0, CH1, CH2, CH3, . . . , CHi, the controller 130 may select the best transmission channels CH1, CH2 and CH3 for the first read command, the first write command and the second read command, as the best reception channels for the performance result of the first program operation, the performance result of the first read operation and the performance result of the second read operation.

The controller 130 transmits channel information about the best reception channels to the channel hub module 725.

The controller 130 receives the results of the command operations performed in respective memory dies through corresponding best reception channels. The results of the command operations performed in respective memory dies are transmitted to the channel hub module 725, and the channel hub module 725 transmits, to the controller 130, the results of the command operations through corresponding best reception channels according the channel information about the best reception channels received from the controller 130. For example, the controller 130 may receive the performance result of the first read operation through the best reception channel CH2, the performance result of the second read operation through the best reception channel CH3, the performance result of the first program operation through the best reception channel CH1, and the performance result of the second program operation through the best reception channel CH4.

Since the controller 130 independently determines the best transmission channels for the plurality of commands and the best reception channels for the performance results depending on the states of the plurality of channels CH0, CH1, CH2, CH3, . . . , CHi as described above, channels through which the commands are transmitted and channels through which the performance results of the command operations corresponding to the respective commands are received become independent of each other. That is, the transmission channels of the commands and the reception channels of the performance results of command operations may be different channels or may be the same channels. For example, the transmission channel CH1 of the first read command and the reception channel CH2 of the performance result of the first read operation, the transmission channel CH2 of the first write command and the reception channel CH1 of the performance result of the first program operation, and the transmission channel CH0 of the second write command and the reception channel CH4 of the performance result of the second program operation are an example of the transmission channels and the reception channels being different. The transmission channel CH3 of the second read command and the reception channel CH3 of the performance result of the second read operation is an example of the transmission channel and the reception channel being the same.

After receiving the performance results of the command operations corresponding to the plurality of commands through the best reception channels, the controller 130 releases the best reception channels for the results of the plurality of command operations such that the best reception channels become available ones of the memory channels CH0 to Chi to be shared for the memory dies 610 to 695 at a next transmission of results of command operation performed in response to commands. The controller 130 may perform the above-described operation of selecting best transmission channels each time a group of commands among the plurality of commands are to be transferred from the controller 130 to the memory dies 610 to 695. The controller 130 may perform the above-described operation of selecting best reception channels each time a group of results of command operations performed in response to the group of commands are to be transferred from the memory dies 610 to 695 to the controller 130.

The controller 130 matches the descriptors of the commands transmitted through the best transmission channels and the descriptors of the results of the command operations received through the best reception channels, and then, provides the results of the command operations to the host 102 as responses to the commands. For example, when the memory device 150 provides a result of a first read operation (e.g., a first data read from the memory device 150) in response to a first read command, the controller 130 matches the descriptor of the first read command transmitted through the best transmission channel CH1 and the descriptor of the result of the first read operation received through the best reception channel CH2, and then, provides the result of the first read operation, that is, the first read data, to the host 102.

Figure 8:
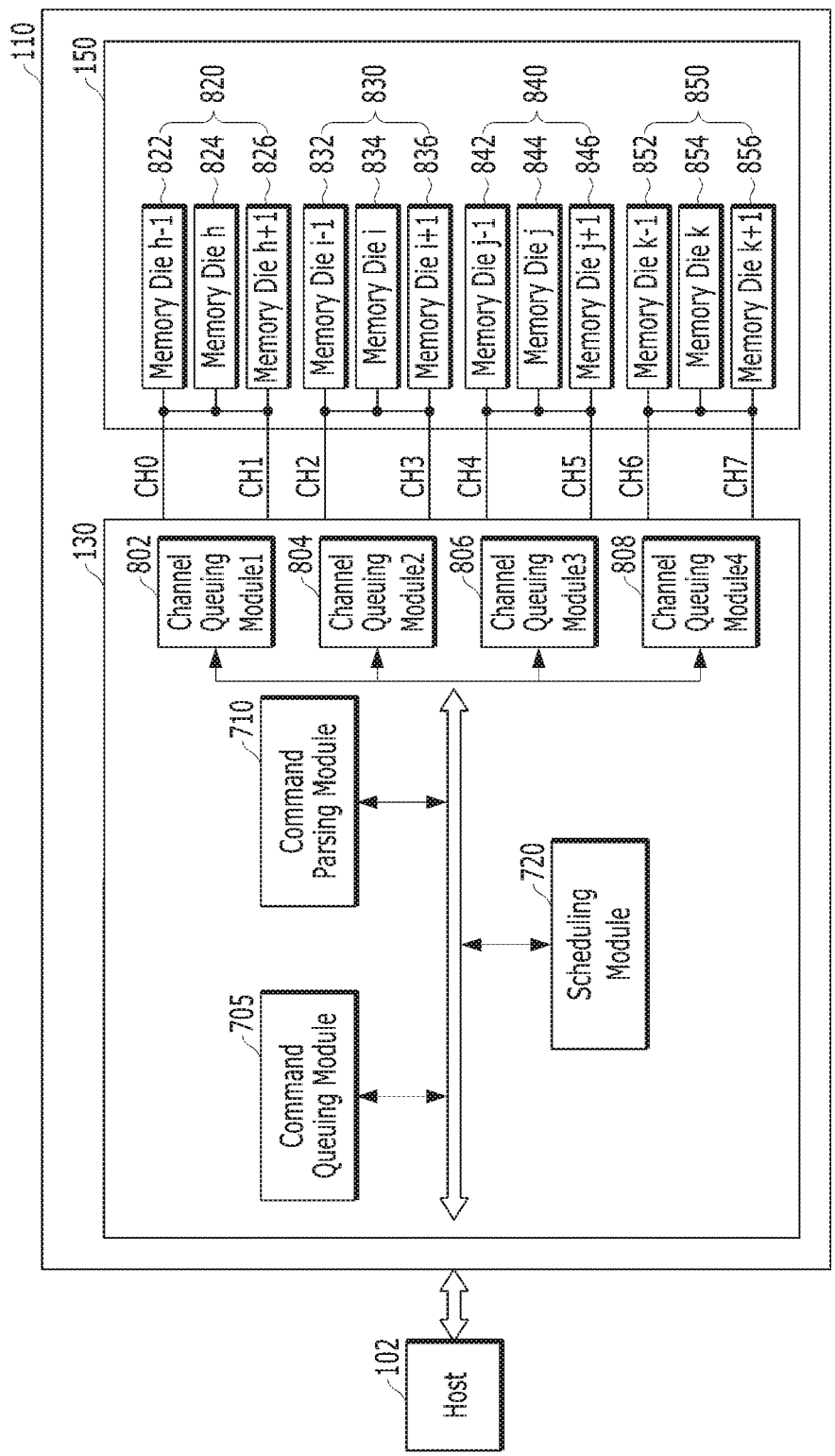
FIG. 8 is a schematic diagram of another exemplary configuration of a data processing system in accordance with an embodiment of the present invention.

Referring to FIG. 8, the memory device 150 includes a plurality of memory dies 822 to 856. The memory dies 822 to 856 may be divided into a plurality of memory die groups 820 to 850.

Memory dies in each of the respective memory die groups 820 to 850 may share a plurality of channels. FIG. 8 exemplifies three memory dies in each memory die groups 820 to 850 shares two channels. For instance, among the plurality of memory dies 822 to 856 included in the memory device 150, the memory dies 822, 824 and 826 of a first memory die group 820 are coupled to first shared channels CH0 and CH1, the memory dies 832, 834 and 836 of a second memory die group 830 are coupled to second shared channels CH2 and CH3, the memory dies 842, 844 and 846 of a third memory die group 840 are coupled to third shared channels CH4 and CH5, and the memory dies 852, 854 and 856 of a fourth memory die group 850 are coupled to fourth shared channels CH6 and CH7.

The controller 130 queues, through a plurality of channel queuing modules 802 to 808, the respective shared channels CH0 to CH7 for the respective memory die groups 820 to 850. In particular, the controller 130 queues the first shared channels CH0 and CH1 through a first channel queueing module 802, queues the second shared channels CH2 and CH3 through a second channel queueing module 804, queues the third shared channels CH4 and CH5 through a third channel queueing module 806, and queues the fourth shared channels CH6 and CH7 through a fourth channel queueing module 808. While it is described as an example in accordance with an embodiment of the present disclosure for the sake of convenience in explanation that a channel queuing module queues the corresponding shared channels, it Is to be noted that the same principle may be applied even in the case where a certain channel queuing module queues shared channels other than the corresponding shared channels.

The channel queuing modules 802 to 808 of the controller 130 queue the corresponding shared channels CH0 to CH7 for the plurality of memory dies 822 to 856. In other words, the first channel queueing module 802 queues the first shared channels CH0 and CH1, the second channel queueing module 804 queues the second shared channels CH2 and CH3, the third channel queueing module 806 queues the third shared channels CH4 and CH5, and the fourth channel queueing module 808 queues the fourth shared channels CH6 and CH7. Since the respective channel queuing modules 802 to 808 queue the corresponding shared channels CH0 to CH7, it is possible to reduce a monitoring cost for checking the plurality of channels CH0 to CH7 and a scheduling cost after checking.

The controller 130 performs channel switching to the best transmission channels and the best reception channels selected according to the states of respective shared channels CH0 to CH7 through the respective channel queuing modules 802 to 808.

The respective channel queuing modules 802 to 808, stores channel information on the best transmission channels.

For example, in the case where a third read command, a fourth read command, a third write command and a fourth write command are respectively provided from the host 102, the controller 130 checks the states of the plurality of channels CH0 to CH7, and determines best transmission channels for transmitting the third read command, the fourth read command, the third write command and the fourth write command, among the plurality of channels CH0 to CH7. In the case where the controller 130 transmits the third read command and the third write command at a certain point of time t4 and transmits the fourth read command and the fourth write command at a certain point of time t5, the controller 130 determines best transmission channels at the point of time t4, that is, best transmission channels for the third read command and the third write command, and determines best transmission channels at the point of time t5, that is, best transmission channels for the fourth read command and the fourth write command, depending on the states of the channels CH0 to CH7. For instance, the controller 130 determines the best transmission channel of the third read command as CH1 and determines the best transmission channel of the fourth read command as CH0 among the plurality of channels CH0 to CH7, in particular, between the first shared channels CH0 and CH1 queued through the first channel queueing module 802, and determines the best transmission channel of the third write command as CH2 and determines the best transmission channel of the fourth write command as CH3 among the plurality of channels CH0 to CH7, in particular, between the second shared channels CH2 and CH3 queued through the second channel queueing module 804. The controller 130 generates and stores channel information on the best transmission channels for the respective commands, that is, channel mapping information between the respective commands and the best transmission channels, and stacks the descriptors of the respective commands to be transmitted through the best transmission channels.

For example, the controller 130 transmits the third read command through the best transmission channel CH1, and according to this fact, the third read command is transmitted to corresponding memory dies, for example, the memory die h 824. The controller 130 transmits the third write command through the best transmission channel CH2, and according to this fact, the third write command is transmitted to corresponding memory dies, for example, the memory die i 834. The controller 130 transmits the fourth read command through the best transmission channel CH0, and according to this fact, the fourth read command is transmitted to corresponding memory dies, for example, the memory die h+1 826. The controller 130 transmits the fourth write command through the best transmission channel CH3, and according to this fact, the fourth write command is transmitted to corresponding memory dies, for example, the memory die i+1 836.

For example, after transmitting the third read command through the best transmission channel CH1, the controller 130 releases the best transmission channel CH1 for the third read command. Also, after transmitting the third write command, the fourth read command and the fourth write command through the best transmission channels CH2, CH0 and CH3, the controller 130 releases the best transmission channels CH2, CH0 and CH3 for the third write command, the fourth read command and the fourth write command. According to this fact, the controller 130 shares the best transmission channels CH1, CH2, CH0 and CH3 for transmission and reception of other commands or performance results, that is, for other command operations, without occupying the best transmission channels CH1, CH2, CH0 and CH3 as dedicated channels for the third read command, the third write command, the fourth read command and the fourth write command, that is, without occupying the best transmission channels CH1, CH2, CH0 and CH3 as dedicated channels for command operations corresponding to the third read command, the third write command, the fourth read command and the fourth write command.

For example, a third read operation corresponding to the third read command is performed in the memory die h 824, a third program operation corresponding to the third write command is performed in the memory die i 834, a fourth read operation corresponding to the fourth read command is performed in the memory die h+1 826, and a fourth program operation corresponding to the fourth write command is performed in the memory die i+1 836.

In the case where the controller 130 receives performance results of the third read operation and the fourth read operation at a certain point of time t6 and receives performance results of the third program operation and the fourth program operation at a certain point of time t7, depending on the states of the channels CH0 to CH7, best reception channels at the point of time t6 are determined, that is, best reception channels for the performance result of the third read operation and the performance result of the fourth read operation are determined, and best reception channels at the point of time t7 are determined, that is, best reception channels for the performance result of the third program operation and the performance result of the fourth program operation are determined. For instance, the controller 130 determines the best reception channel of the performance result of the third read operation as CH0 and determines the best reception channel of the performance result of the fourth read operation as CH1 among the plurality of channels CH0 to CH7, in particular, between the first shared channels CH0 and CH1 queued through the first channel queueing module 802, and determines the best reception channel of the performance result of the third program operation as CH2 and determines the best reception channel of the performance result of the fourth program operation as CH3 among the plurality of channels CH0 to CH7, in particular, between the second shared channels CH2 and CH3 queued through the second channel queueing module 804.

For example, the controller 130 receives the performance result of the third read operation through the best reception channel CH0, receives the performance result of the fourth read operation through the best reception channel CH1, receives the performance result of the third program operation through the best reception channel CH2, and receives the performance result of the fourth program operation through the best reception channel CH4.

For example, after receiving the performance result of the third read operation, the performance result of the fourth read operation, the performance result of the third program operation and the performance result of the fourth program operation through the best reception channels CH0 to CH3, the controller 130 releases the best reception channels CH0 to CH3 for the performance result of the third read operation, the performance result of the fourth read operation, the performance result of the third program operation and the performance result of the fourth program operation.

For example, the controller 130 matches the descriptor of the third read command transmitted through the best transmission channel CH1 and the descriptor of the performance result of the third read operation received through the best reception channel CH0, and then, provides the performance result of the third read operation, that is, third read data, to the host 102 as a response to the third read command. The controller 130 matches the descriptor of the fourth read command transmitted through the best transmission channel CH0 and the descriptor of the performance result of the fourth read operation received through the best reception channel CH1, and then, provides the performance result of the fourth read operation, that is, fourth read data, to the host 102 as a response to the fourth read command. The controller 130 matches the descriptor of the third write command transmitted through the best transmission channel CH2 and the descriptor of the performance result of the third program operation received through the best reception channel CH2, and then, provides the performance result of the third program operation, that is, a signal which indicates normal storage of third write data, to the host 102 as a response to the third write command. The controller 130 matches the descriptor of the fourth write command transmitted through the best transmission channel CH3 and the descriptor of the performance result of the fourth program operation received through the best reception channel CH3, and then, provides the performance result of the fourth program operation, that is, a signal which indicates normal storage of fourth write data, to the host 102 as a response to the fourth write command.

In accordance with an embodiment of the present disclosure, the controller 130 checks a plurality of channels for the memory device 150 and the states of the plurality of channels, independently determines best transmission channels for a plurality of commands and best reception channels for performance results of command operations corresponding to the commands, in correspondence to the states of the channels, and transmits the commands through the best transmission channels, that is, requests performing of the command operations, and receives the performance results through the best reception channels. Further, in an embodiment, a data processing system is provided including a plurality of memory systems 110 each memory system including the controller 130 and the memory device 150. In the memory systems each including the controller 130 and the memory device 150, a plurality of channels for the plurality of memory systems and the states of the plurality of channels are checked, best transmission channels for a plurality of commands and best reception channels for performance results of command operations corresponding to the commands are independently determined in correspondence to the states of the channels, and the commands are transmitted through the best transmission channels, that is, performing of the command operations is requested, and the performance results are received through the best reception channels.

In other words, in accordance with an embodiment of the present disclosure, channels through which performing of command operations is requested and channels through which performance results of the command operations are received as responses are independently determined and managed according to a user request, in particular, performance request channels and performance response channels for optional command operations are determined and managed as best independent channels depending on the states of the channels. This is advantageous because a plurality of command operations may be more quickly and typically performed through the independently selected best transmission and reception channels, and the utilization efficiency of the channels and the reliability of the memory system 110 may be improved.

Figure 9:
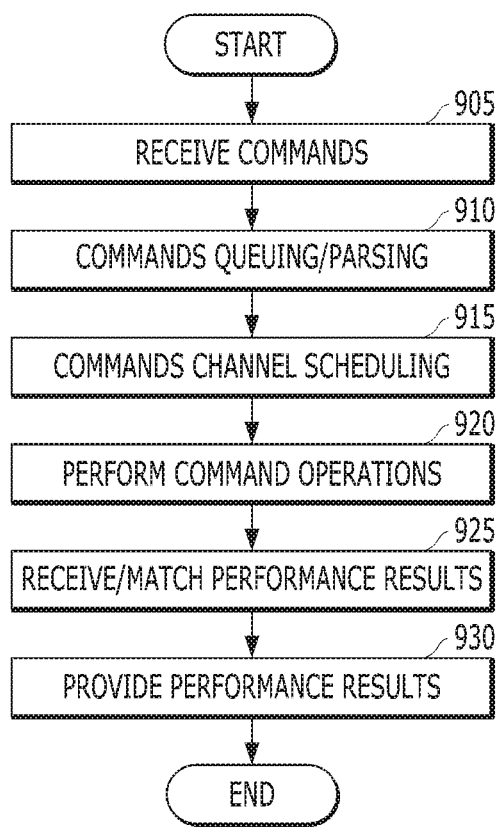
FIG. 9 is a flow chart illustrating an operation method for processing a plurality of commands in accordance with an embodiment of the present invention.

FIG. 9 is a flow chart illustrating an operation process of a memory system, in accordance with an embodiment.

Referring to FIG. 9, at step 905, the memory system 110 receives a plurality of commands from the host 102. The memory system 110 may receive the plurality of commands sequentially and successively from the host 102.

At step 910, the plurality of commands are queued and parsed. Command operations corresponding to the plurality of commands and the memory device 150 in which the command operations are to be performed are checked.

At step 915, a plurality of channels for the memory device 150 are queued, the states of the plurality of channels are checked, and then, channels for the plurality of commands are scheduled. In this regard, in correspondence to the states of the plurality of channels, best transmission channels for transmitting the commands are determined, and best reception channels for receiving performance results of the command operations corresponding to the commands are determined.

At step 920, the command operations are performed. Specifically, through the best transmission channels, the commands are transmitted to the memory device 150, in particular, to corresponding memory dies among the plurality of memory dies included in the memory device 150, and accordingly, the command operations are performed in the memory dies of the memory device 150.

At step 925, the performance results of the command operations are received through the best reception channels from the memory device 150, and the commands transmitted through the best transmission channels and the performance results received through the best reception channels are matched with each other.

Then, at step 930, the performance results of the command operations are provided to the host 102 as responses to the plurality of commands.

Since detailed descriptions were made above with reference to FIGS. 5 to 8 for independently determining best transmission channels and best reception channels depending on the states of a plurality of channels for a plurality of memory systems each of which includes the controller 130 and the memory device 150 or the states of a plurality of channels for the memory device 150 which includes a plurality of memory dies, requesting command operations corresponding to commands through the best transmission channels and receiving performance results of the command operations through the best reception channels, further descriptions thereof will be omitted herein.

FIGS. 10 to 18 are diagrams schematically illustrating application examples of the data processing system of FIG. 1.

Figure 10:
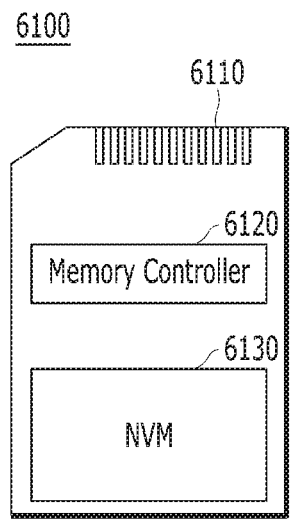
FIGS. 10 to 18 are diagrams schematically illustrating exemplary applications of a data processing system, in accordance with various embodiments of the present invention.

FIG. 10 is a diagram schematically illustrating another example of the data processing system including the memory system in accordance with the present embodiment. FIG. 10 schematically illustrates a memory card system to which the memory system in accordance with the present embodiment is applied.

Referring to FIG. 10, the memory card system 6100 may include a memory controller 6120, a memory device 6130 and a connector 6110.

More specifically, the memory controller 6120 may be connected to the memory device 6130 embodied by a nonvolatile memory, and configured to access the memory device 6130. For example, the memory controller 6120 may be configured to control read, write, erase and background operations of the memory device 6130. The memory controller 6120 may be configured to provide an interface between the memory device 6130 and a host, and drive firmware for controlling the memory device 6130. That is, the memory controller 6120 may correspond to the controller 130 of the memory system 110 described with reference to FIGS. 1 and 5, and the memory device 6130 may correspond to the memory device 150 of the memory system 110 described with reference to FIGS. 1 and 5.

Thus, the memory controller 6120 may include a RAM, a processing unit, a host interface, a memory interface and an error correction unit. The memory controller 130 may further include the elements shown in FIG. 5.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component Interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with the present embodiment may be applied to wired/wireless electronic devices or particularly mobile electronic devices.

The memory device 6130 may be implemented by a nonvolatile memory. For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM). The memory device 6130 may include a plurality of dies as in the memory device 150 of FIG. 5.

The memory controller 6120 and the memory device 6130 may be integrated into a single semiconductor device. For example, the memory controller 6120 and the memory device 6130 may construct a solid state driver (SSD) by being integrated into a single semiconductor device. Also, the memory controller 6120 and the memory device 6130 may construct a memory card such as a PC card (PCMCIA: Personal Computer Memory Card International Association), a compact flash (CF) card, a smart media card (e.g., SM and SMC), a memory stick, a multimedia card (e.g., MMC, RS-MMC, MMCmicro and eMMC), an SD card (e.g., SD, miniSD, microSD and SDHC) and a universal flash storage (UFS).

Figure 11:
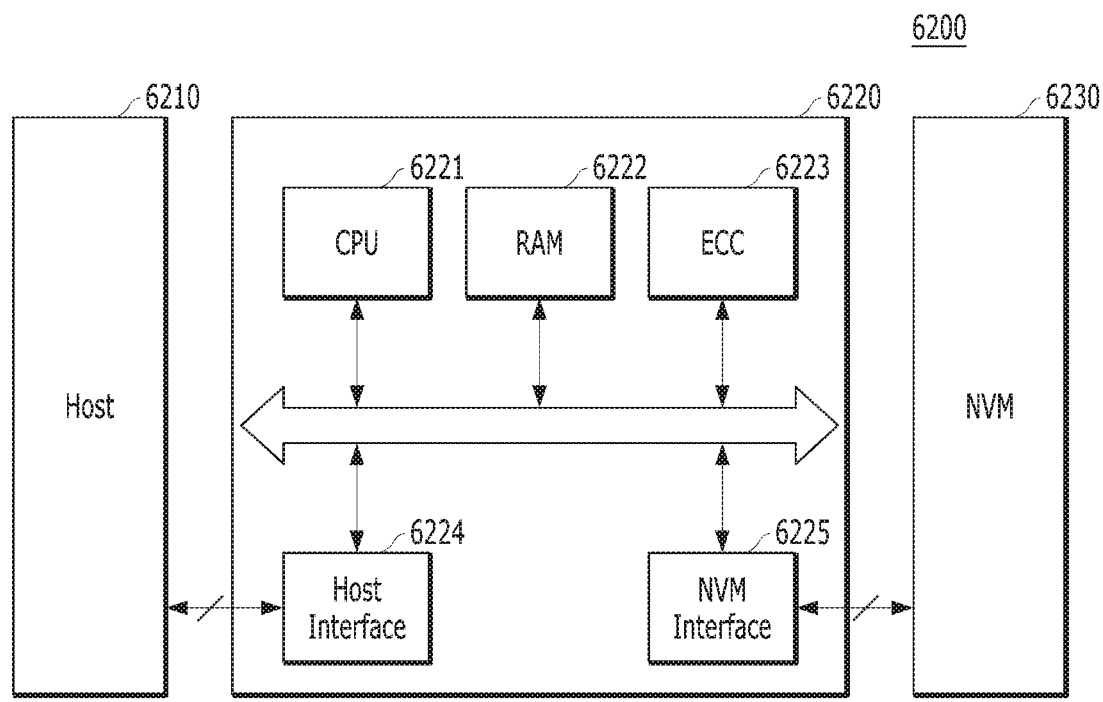

FIG. 11 is a diagram schematically illustrating another example of the data processing system including the memory system in accordance with the present embodiment.

Referring to FIG. 11, the data processing system 6200 may include a memory device 6230 having one or more nonvolatile memories and a memory controller 6220 for controlling the memory device 6230. The data processing system 6200 illustrated in FIG. 11 may serve as a storage medium such as a memory card (CF, SD, micro-SD or the like) or USB device, as described with reference to FIG. 1. The memory device 6230 may correspond to the memory device 150 illustrated in FIGS. 1 and 5, and the memory controller 6220 may correspond to the controller 130 illustrated in FIGS. 1 and 5.

The memory controller 6220 may control a read, write or erase operation on the memory device 6230 in response to a request of the host 6210, and the memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC unit 138 of the controller 130 illustrated in FIG. 1. As described with reference to FIG. 1, the ECC circuit 6223 may generate an ECC (Error Correction Code) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. At this time, the ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may transmit/receive data to/from the host 6210 through the host interface 6224, and transmit/receive data to/from the memory device 6230 through the NVM interface 6225. The host interface 6224 may be connected to the host 6210 through a PATA bus, SATA bus, SCSI, USB, PCIe or NAND interface. The memory controller 6220 may have a wireless communication function with a mobile communication protocol such as WiFi or Long Term Evolution (LTE). The memory controller 6220 may be connected to an external device, for example, the host 6210 or another external device, and then transmit/receive data to/from the external device. In particular, as the memory controller 6220 is configured to communicate with the external device through one or more of various communication protocols, the memory system and the data processing system in accordance with the present embodiment may be applied to wired/wireless electronic devices or particularly a mobile electronic device.

Figure 12:
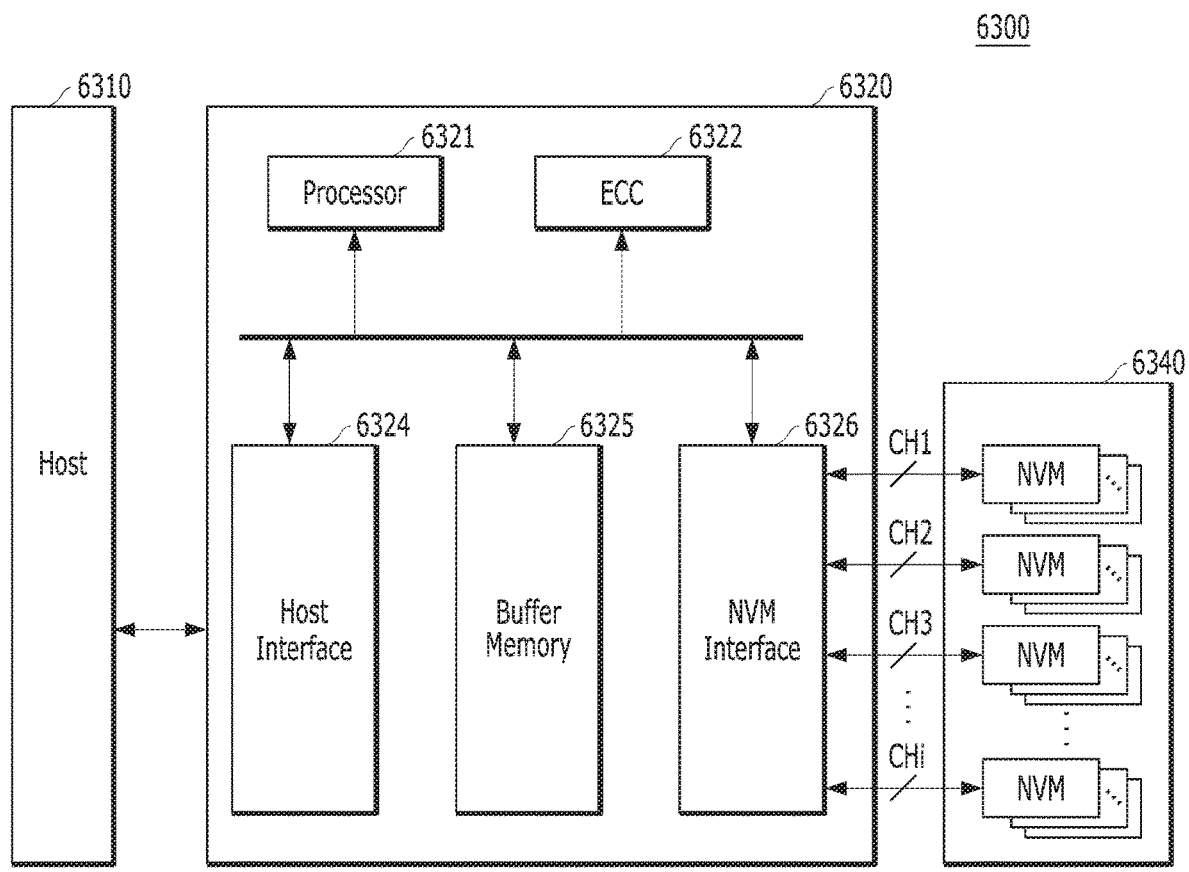

FIG. 12 is a diagram schematically illustrating another example of the data processing system including the memory system in accordance with the present embodiment. FIG. 12 schematically illustrates an SSD to which the memory system in accordance with the present embodiment is applied.

Referring to FIG. 12, the SSD 6300 may include a controller 6320 and a memory device 6340 including a plurality of nonvolatile memories. The controller 6320 may correspond to the controller 130 of the memory system of FIGS. 1 to 9, and the memory device 6340 may correspond to the memory device 150 of the memory system of FIGS. 1 to 9.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as DRAM, SDRAM, DDR SDRAM, LPDDR SDRAM and GRAM or nonvolatile memories such as FRAM, ReRAM, STT-MRAM and PRAM. For convenience of description, FIG. 11 illustrates that the buffer memory 6325 exists in the controller 6320. However, the buffer memory 6325 may exist outside the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIGS. 1 to 9 is applied may be provided to embody a data processing system, for example, RAID (Redundant Array of Independent Disks) system. At this time, the RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 13:
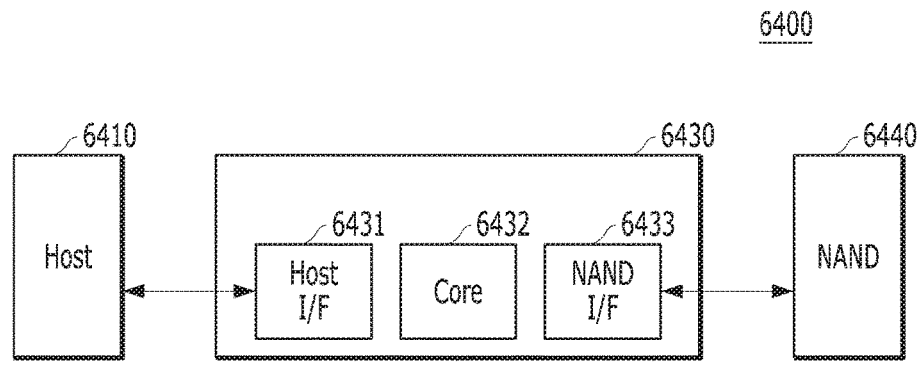

FIG. 13 is a diagram schematically illustrating another example of the data processing system including the memory system in accordance with the present embodiment. FIG. 13 schematically illustrates an embedded Multi-Media Card (eMMC) to which the memory system in accordance with the present embodiment is applied.

Referring to FIG. 13, the eMMC 6400 may include a controller 6430 and a memory device 6440 embodied by one or more NAND flash memories. The controller 6430 may correspond to the controller 130 of FIGS. 1 to 9, and the memory device 6440 may correspond to the memory device 150 of FIGS. 1 to 9.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 14 to 17 are diagrams schematically illustrating other examples of the data processing system including the memory system in accordance with the present embodiment. FIGS. 14 to 17 schematically illustrate UFS (Universal Flash Storage) systems to which the memory system in accordance with the present embodiment is applied.

Referring to FIGS. 14 to 17, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired/wireless electronic devices or particularly mobile electronic devices, the UFS devices 6520, 6620, 6720 and 6820 may serve as embedded UFS devices, and the UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired/wireless electronic devices or particularly mobile electronic devices through UFS protocols, and the UFS devices 6520, 6620, 6720 and 6820 and the UFS cards 6530, 6630, 6730 and 6830 may be embodied by the memory system 110 illustrated in FIGS. 1 to 9. For example, in the UFS systems 6500, 6600, 6700 and 6800, the UFS devices 6520, 6620, 6720 and 6820 may be embodied in the form of the data processing system 6200, the SSD 6300 or the eMMC 6400 described with reference to FIGS. 11 to 13, and the UFS cards 6530, 6630, 6730 and 6830 may be embodied in the form of the memory card system 6100 described with reference to FIG. 10.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720 and 6820 and the UFS cards 6530, 6630, 6730 and 6830 may communicate with each other through various protocols other than the UFS protocol, for example, UFDs, MMC, SD, mini-SD, and micro-SD.

Figure 14:
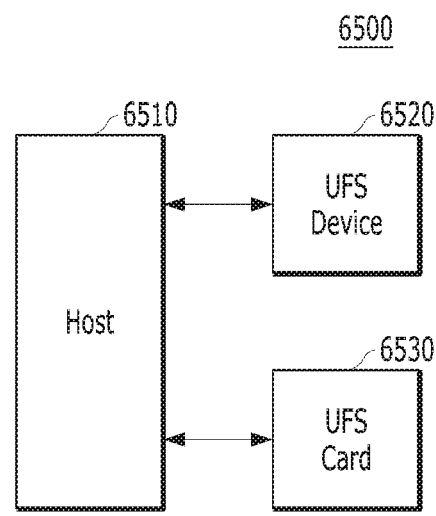

In the UFS system 6500 illustrated in FIG. 14, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. At this time, the UFS device 6520 and the UFS card 6530 may communicate with each other through link layer switching at the UniPro of the host 6510. In the present embodiment, the configuration in which one UFS device 6520 and one UFS card 6530 are connected to the host 6510 has been exemplified for convenience of description. However, a plurality of UFS devices and UFS cards may be connected in parallel or in the form of a star to the host 6410, and a plurality of UFS cards may be connected in parallel or in the form of a star to the UFS device 6520 or connected in series or in the form of a chain to the UFS device 6520.

Figure 15:
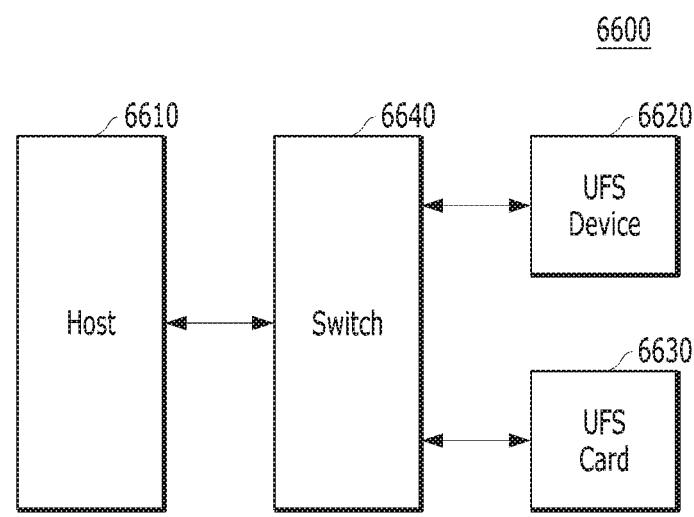

In the UFS system 6600 illustrated in FIG. 15, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the present embodiment, the configuration in which one UFS device 6620 and one UFS card 6630 are connected to the switching module 6640 has been exemplified for convenience of description. However, a plurality of UFS devices and UFS cards may be connected in parallel or in the form of a star to the switching module 6640, and a plurality of UFS cards may be connected in series or in the form of a chain to the UFS device 6620.

Figure 16:
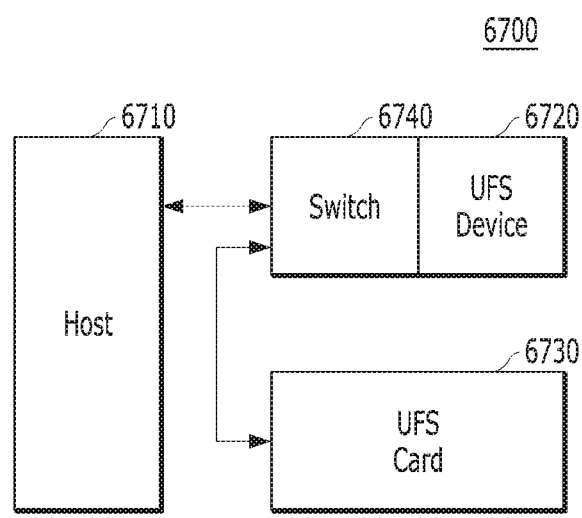

In the UFS system 6700 illustrated in FIG. 16, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. At this time, the UFS device 6720 and the UFS card 6730 may communicate with each other through link layer switching of the switching module 6740 at the UniPro, and the switching module 6740 may be integrated as one module with the UFS device 6720 inside or outside the UFS device 6720. In the present embodiment, the configuration in which one UFS device 6720 and one UFS card 6730 are connected to the switching module 6740 has been exemplified for convenience of description. However, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 17:
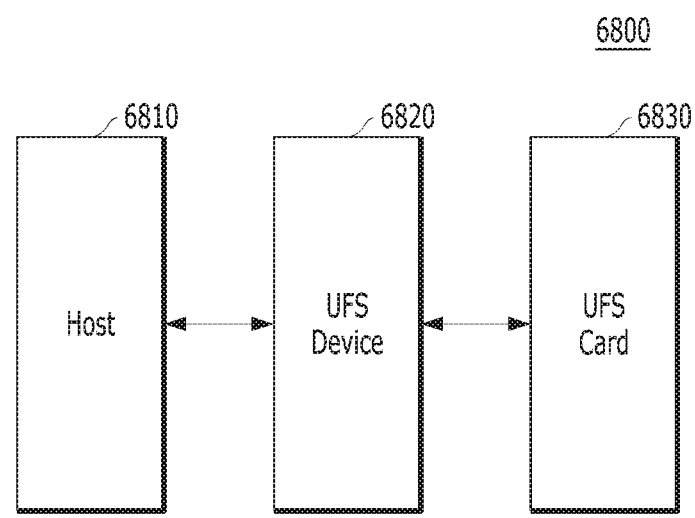

In the UFS system 6800 illustrated in FIG. 17, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. At this time, the host 6810 and the UFS card 6830 may communicate with each other through target ID switching between the M-PHY and UniPro modules of the UFS device 6820. In the present embodiment, the configuration in which one UFS device 6820 is connected to the host 6810 and one UFS card 6830 is connected to the UFS device 6820 has been exemplified for convenience of description. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 18:
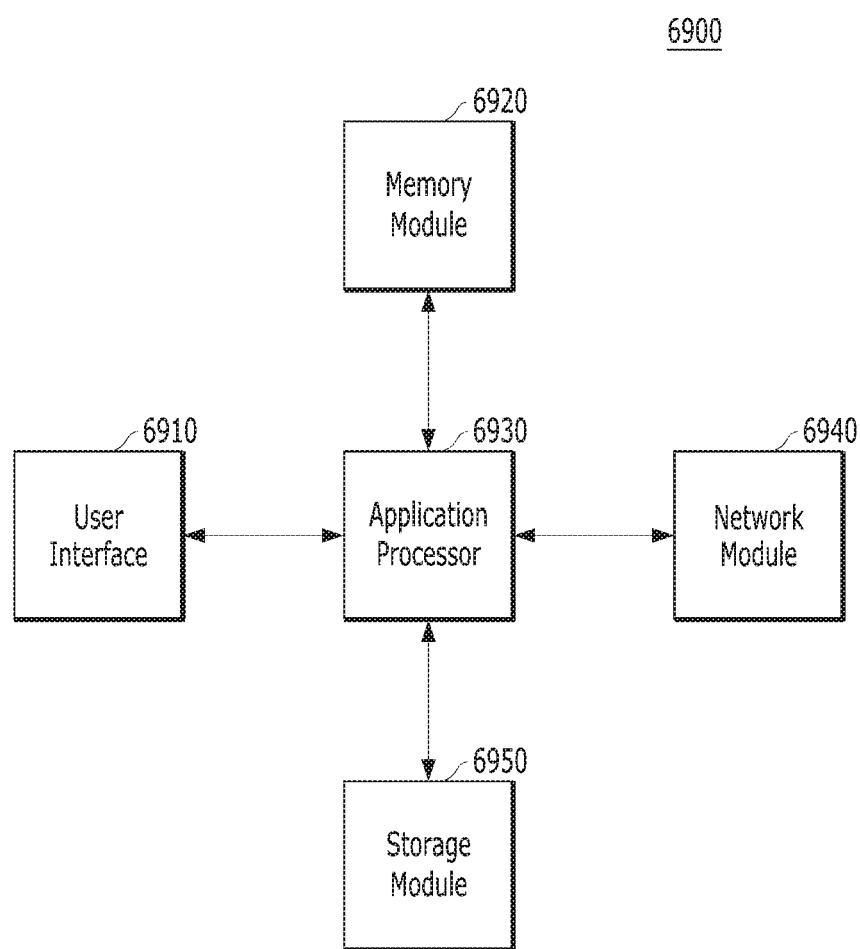

FIG. 18 is a diagram schematically illustrating another example of the data processing system including the memory system in accordance with an embodiment of the present invention. FIG. 18 is a diagram schematically illustrating a user system to which the memory system in accordance with the present embodiment is applied.

Referring to FIG. 18, the user system 6900 may include an application processor 6930, a memory module 6920, a network module 6940, a storage module 6950 and a user interface 6910.

More specifically, the application processor 6930 may drive components included in the user system 6900, for example, an OS, and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile RAM such as DRAM, SDRAM, DDR SDRAM, DDR2 SDRAM, DDR3 SDRAM, LPDDR SDARM, LPDDR3 SDRAM or LPDDR3 SDRAM or a nonvolatile RAM such as PRAM, ReRAM, MRAM or FRAM. For example, the application processor 6930 and the memory module 6920 may be packaged and mounted, based on POP (Package on Package).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIGS. 1 to 9. Furthermore, the storage module 6950 may be embodied as an SSD, eMMC and UFS as described above with reference to FIGS. 12 to 17.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIGS. 1 to 9 is applied to a mobile electronic device of the user system 6900, the application processor 6930 may control overall operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

The memory system, the data processing system and the operating method thereof according to various embodiments of the present invention may reduce the complexity performance deterioration of the memory system enhance the use efficiency of a memory device, and more quickly and stably process data with respect to the memory device.

Although the invention has been described in terms of various specific embodiments for illustrative purposes, it will be apparent to those skilled in the art that various other changes and modifications may be made without departing from the spirit and scope of the invention as defined in the following claims.

What is claimed is:

1. A memory system configured to communicate with a host, the memory system comprising:
   a memory device including a plurality of memory dies is configured to store data; and
   a controller operatively coupled to the memory dies of the memory device via a plurality of channels,
   wherein the controller selects first channel and second channel among the plurality of channels respectively as at least one transmission channel and at least one reception channel, releases the first channel after requesting first command operation through the first channel, releases the second channel after receiving performance results of the first command through the second channel, reselects released the first channel and released the second channel respectively as the reception channel and the transmission channel, releases reselected the second channel after requesting second command operation through reselected the second channel, and releases reselected the first channel after receiving performance results of the second command through reselected the first channel.

2. The memory system according to claim 1, wherein the controller checks states of the plurality of channels, and selects the transmission channel and the reception channel according to the checked states of the plurality of channels.

3. The memory system according to claim 2, wherein the states of the plurality of channels include at least one of a busy state, a ready state, an active state and an idle state.

4. The memory system according to claim 3, wherein the controller selects at least one channel in the ready state or the idle state among the plurality of channels as the transmission channels or the reception channels.

5. The memory system according to claim 1, wherein the controller matches descriptors of the commands for the command operations requested through the transmission channels and descriptors of the performance results received through the reception channels.

6. The memory system according to claim 5, wherein both the descriptors of the commands and the descriptors of the performance results include data information or location information corresponding to the commands.

7. The memory system according to claim 1, wherein further comprising a channel hub module coupled with the controller through the plurality of the channels, and configured to transfer the first command from the controller to the at least one memory die through the first channel and the performance result of the first command operation from the at least one memory die to the controller through the second channel.

8. A method for operating a memory system, the method comprising:
   checking a plurality of channels for a memory device including a plurality of memory dies;
   selecting first channel and second channel among the channels respectively as at least one transmission channel and at least one reception channel according to the checked states of the channels;
   releasing the first channel after requesting first command operation through the first channel;
   releasing the second channel after receiving performance result of the first command operation through the second channel;
   reselecting released the first channel and released the second channel respectively as the reception channel and the transmission channel;
   releasing reselected the second channel after requesting second command operation through reselected the second channel; and
   releasing reselected the first channel after receiving performance result of the second command operation through reselected the first channel.

9. The method according to claim 8, further comprising matching descriptors of the commands for the first command operation requested through the first channels and descriptors of the performance results of the command operation received through the second channels.

* * * * *